United States Patent
Park et al.

(10) Patent No.: US 10,170,903 B2
(45) Date of Patent: *Jan. 1, 2019

(54) HIGH VOLTAGE DC CIRCUIT BREAKER

(71) Applicant: HYOSUNG CORPORATION, Seoul (KR)

(72) Inventors: Jung-Soo Park, Gyeonggi-do (KR); Se-Hee Han, Seoul (KR); Hui-dong Hwang, Gyeongsangnam-do (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 345 days.

This patent is subject to a terminal disclaimer.

(21) Appl. No.: 14/912,092

(22) PCT Filed: Aug. 14, 2014

(86) PCT No.: PCT/KR2014/007604
§ 371 (c)(1),
(2) Date: Feb. 15, 2016

(87) PCT Pub. No.: WO2015/023157
PCT Pub. Date: Feb. 19, 2015

(65) Prior Publication Data
US 2016/0204595 A1 Jul. 14, 2016

(30) Foreign Application Priority Data
Aug. 14, 2013 (KR) .................. 10-2013-0096253

(51) Int. Cl.
*H01H 9/30* (2006.01)
*H02H 3/16* (2006.01)
(Continued)

(52) U.S. Cl.
CPC .............. *H02H 3/16* (2013.01); *H01H 9/542* (2013.01); *H02H 3/087* (2013.01); *H01H 33/56* (2013.01); *H02H 3/021* (2013.01)

(58) Field of Classification Search
USPC ............................ 361/2, 4, 8, 9, 10, 11, 13
See application file for complete search history.

(56) References Cited

U.S. PATENT DOCUMENTS 4,110,806 A * 8/1978 Murano ............... H01F 38/023
307/135
4,172,268 A * 10/1979 Yanabu ............... H01H 33/596
307/134
(Continued)

FOREIGN PATENT DOCUMENTS

JP 06-003872 A 1/1994
JP 06-181027 A 6/1994
(Continued)

OTHER PUBLICATIONS

International Search Report for PCT/KR2014/007604 dated Dec. 11, 2014 from Korean Intellectual Property Office.

*Primary Examiner* — Ronald W Leja
(74) *Attorney, Agent, or Firm* — Revolution IP, PLLC

(57) ABSTRACT

A high-voltage DC circuit breaker for breaking a current that flows in a DC line, including: a main switch, installed on the DC line, for breaking a current of the DC line by opening when a fault occurs on one side or a remaining side of the DC line; a nonlinear resistor connected in parallel with the main switch; an LC circuit that is connected in parallel with the main switch and includes a capacitor and a reactor, which are connected in series in order to generate LC resonance; a first bidirectional switching element, connected to the LC circuit in series, for switching a bidirectional current flow; and a second bidirectional switching element, connected in parallel with the LC circuit, for switching a current flow to induce LC resonance in both directions.

11 Claims, 3 Drawing Sheets

(51) Int. Cl.
*H02H 3/087* (2006.01)
*H01H 9/54* (2006.01)
*H01H 33/56* (2006.01)
*H02H 3/02* (2006.01)

(56) References Cited

U.S. PATENT DOCUMENTS

| | | | | |
|---|---|---|---|---|
| 4,740,858 A * | 4/1988 | Yamaguchi | ........... | H01H 33/596 361/3 |
| 4,920,448 A * | 4/1990 | Bonhomme | ........... | H01H 3/222 361/102 |
| 5,121,281 A | 6/1992 | Pham et al. | | |
| 5,214,557 A * | 5/1993 | Hasegawa | ........... | H01H 33/596 361/11 |
| 5,402,297 A * | 3/1995 | Ouchi | .................. | H01H 33/596 361/1 |
| 5,452,170 A * | 9/1995 | Ohde | ................... | H01H 33/596 174/DIG. 17 |
| 5,517,378 A * | 5/1996 | Asplund | .............. | H01H 33/596 361/3 |
| 5,883,774 A * | 3/1999 | Kida | ........................ | H02H 9/08 361/47 |
| 8,837,093 B2 * | 9/2014 | Panousis | .............. | H01H 33/596 361/13 |
| 8,947,843 B2 * | 2/2015 | Juhlin | .................... | H01H 71/00 361/115 |
| 8,995,097 B2 * | 3/2015 | Skarby | ................... | H02H 3/087 361/2 |
| 9,208,979 B2 * | 12/2015 | Hafner | ................. | H01H 33/596 |
| 9,413,157 B2 * | 8/2016 | Tahata | ................... | H02H 3/087 |
| 2008/0043382 A1 * | 2/2008 | Lee | ........................ | H02H 7/001 361/19 |
| 2013/0020881 A1 * | 1/2013 | Panousis | .............. | H01H 33/596 307/113 |
| 2016/0322177 A1 * | 11/2016 | Hwang | ................. | H02H 3/087 |
| 2016/0329179 A1 * | 11/2016 | Kim | ..................... | H01H 33/596 |
| 2017/0352508 A1 * | 12/2017 | Chung | ................. | H01H 33/596 |
| 2017/0358917 A1 * | 12/2017 | Kim | ....................... | H02H 3/18 |
| 2018/0019084 A1 * | 1/2018 | Kim | ....................... | H02H 3/021 |

FOREIGN PATENT DOCUMENTS

| | | |
|---|---|---|
| JP | 09-017294 A | 1/1997 |
| JP | 11-146555 A | 5/1999 |

* cited by examiner

- Prior Art -

HIGH VOLTAGE DC CIRCUIT BREAKER

CROSS REFERENCE TO PRIOR APPLICATIONS

This application is a National Stage Application of PCT International Patent Application No. PCT/KR2014/007604 filed on Aug. 14, 2014, under 35 U.S.C. § 371, which claims priority to Korean Patent Application No. 10-2013-0096253 filed on Aug. 14, 2013, which are all hereby incorporated by reference in their entirety.

TECHNICAL FIELD

The present invention relates generally to a high-voltage DC circuit breaker and, more particularly, to a high-voltage DC circuit breaker that breaks a fault current flowing in a DC line for power transmission or distribution when a fault occurs on one side of the DC line.

BACKGROUND ART

Generally, a high-voltage DC circuit breaker is a switching device that may break a current flowing through a high-voltage transmission line for 50 kV or more, such as a High-Voltage Direct Current (HVDC) transmission system. Such a high-voltage DC circuit breaker serves to break a fault current when a fault occurs in a DC line. Of course, it may also be applied to an intermediate voltage DC distribution system for a DC voltage level that ranges approximately from 1 to 50 kV.

When a fault current occurs in a system, the high-voltage DC circuit breaker opens a main switch so as to disconnect the circuit in which a fault occurs, whereby the fault current is interrupted. However, because there is no zero current point in a DC line, an arc, generated across the terminals of a main switch when the main switch is opened, is not extinguished. Accordingly, the fault current continuously flows through the arc, and thus the fault current cannot be interrupted.

In order to break a fault current by extinguishing an arc generated when opening a main switch CB in a high-voltage DC circuit breaker, Japanese Patent Application Publication No. 1984-068128, illustrated in FIG. 1, provides a technique in which the arc is extinguished by a zero current at the main switch CB, which is formed by superposing a resonance current Ip, generated by an LC circuit, onto a current $I_{DC}$ that flows in a DC line (Idc=$I_{DC}$+Ip). Specifically, if an auxiliary switch S is closed when the main switch CB is open and an arc is generated, a positive (+) resonance current (Ip>0) is applied to be superposed onto the DC current $I_{DC}$. Then, the resonance current Ip oscillates between positive (+) and negative (−) values due to the resonance between L and C, and the magnitude thereof increases as the oscillation is repeated along the main switch CB. Accordingly, when the magnitude of the negative (+) resonance current (Ip<0) becomes the same as that of $I_{DC}$, the current Idc becomes a zero current, and the arc of the main switch CB is extinguished. However, according to this conventional art, because it is necessary to superpose the positive (+) resonance current Ip, which is equal to or greater than the DC current $I_{DC}$, a circuit rating should be more than two times of that of a rated current. Also, in order to realize such a large resonance current Ip, multiple resonance cycles are necessary, and thus the breaking speed is decreased. Also, the conventional DC circuit breaker has a problem that it cannot interrupt a bidirectional fault current.

DISCLOSURE

Technical Problem

Accordingly, an object of the present invention is to provide a high-voltage DC circuit breaker that may completely break a fault current in a main switch even if the high-voltage DC circuit breaker does not apply a resonance current to the main switch.

Another object of the present invention is to provide a high-voltage DC circuit breaker that may break a bidirectional fault current using a single circuit.

A further object of the present invention is to provide a high-voltage DC circuit breaker that breaks a fault current by applying a small number of semiconductor devices.

Yet another object of the present invention is to provide a high-voltage DC circuit breaker that is implemented so as to be capable of a reclosing operation using a main switch.

Technical Solution

In order to accomplish the above object, a high-voltage DC circuit breaker according to the present invention includes a main switch, installed on the DC line, for breaking a current of the DC line by opening when a fault occurs on one side or a remaining side of the DC line; a nonlinear resistor connected in parallel with the main switch; an LC circuit that is connected in parallel with the main switch and includes a capacitor and a reactor, which are connected in series in order to generate LC resonance; a first bidirectional switching element, connected to the LC circuit in series, for switching a bidirectional current flow; and a second bidirectional switching element, connected in parallel with the LC circuit, for switching a current flow to induce LC resonance in both directions.

In the present invention, the high-voltage DC circuit breaker further includes a charging resistor for charging the capacitor with a DC voltage (Vc) at initial startup, wherein the charging resistor is installed between a ground (GND) and a contact point of the LC circuit and the first bidirectional switching element.

In the present invention, each of the first bidirectional switching element and the second bidirectional switching element includes a pair of turn-on or turn-on/turn-off controllable power semiconductor switches, wherein the pair of the power semiconductor switches are connected in parallel in opposite directions.

In the present invention, if an arc is generated when the main switch is opened due to a fault that occurs on the one side of the DC line, the capacitor is charged with a voltage −Vc induced by the LC resonance between the reactor and the capacitor of the LC circuit by turning on one (G4) of the power semiconductor switches of the second bidirectional switching element in a state in which the power semiconductor switches (G1-G2) of the first bidirectional switching element are turned off; a current is supplied to the main switch by the voltage −Vc, charged in the capacitor, by turning off the power semiconductor switch (G4) and turning on one (G2) of the power semiconductor switches of the first bidirectional switching element; and the supplied current causes a zero current at the main switch, whereby the arc generated in the main switch is extinguished.

In the present invention, the current supplied to the main switch by the voltage −Vc, charged in the capacitor, has a magnitude that is greater than that of a fault current and has a direction opposite to that of the fault current, the fault current continuing to flow through the arc in the main switch.

In the present invention, after the arc generated in the main switch is extinguished, while a voltage at the remaining side of the DC line, which becomes higher than a voltage at the one side of the DC line, is consumed at the nonlinear resistor, the capacitor is recharged with a voltage +Vc by a current that flows through the LC circuit and the first bidirectional switching element, and then the power semiconductor switch (G2) is turned off.

In the present invention, if an arc is generated when the main switch is opened due to a fault that occurs on the remaining side of the DC line, a current is supplied to the main switch by +Vc, previously charged in the capacitor of the LC circuit, by turning on one (G1) of the power semiconductor switches of the first bidirectional switching element in a state in which the power semiconductor switches (G3-G4) of the second bidirectional switching element are turned off, and the supplied current causes a zero current at the main switch (110), whereby the arc generated in the main switch is extinguished.

In the present invention, the current supplied to the main switch by the voltage +Vc, previously charged in the capacitor, has a magnitude that is greater than that of a fault current and has a direction opposite to that of the fault current, the fault current continuing to flow through the arc in the main switch.

In the present invention, after the arc generated in the main switch is extinguished, the power semiconductor switch (G1) is turned off after the capacitor of the LC circuit is charged with −Vc by a voltage on the one side of the DC line, which becomes higher than a voltage on the remaining side of the DC line; and the capacitor is recharged with a voltage +Vc by LC resonance between the capacitor and the reactor of the LC circuit by turning on one (G3) of the power semiconductor switches of the second bidirectional switching element.

In the present invention, the voltage on the one side of the DC line, which becomes higher than the voltage on the remaining side of the DC line, is consumed at the nonlinear resistor.

Advantageous Effects

The present invention completely breaks a fault current by easily and quickly extinguishing an arc generated when a switching operation of a main switch is performed in a high-voltage DC circuit breaker.

Also, the high-voltage DC circuit breaker according to the present invention may break a bidirectional fault current using a single circuit.

Also, according to the present invention, a high-voltage DC circuit breaker is implemented using a minimum number of electrical elements, thus reducing the size and cost of the breaker.

Furthermore, the high-voltage DC circuit breaker according to the present invention may perform a current breaking operation again unless a fault current is removed when an operation of reclosing a main switch is performed.

BEST MODE

Hereinafter, a preferred embodiment of the present invention will be described in detail with reference to the accompanying drawings. Also, detailed descriptions of known functions and configurations which have been deemed to make the gist of the present invention unnecessarily obscure will be omitted below.

Figure 2:
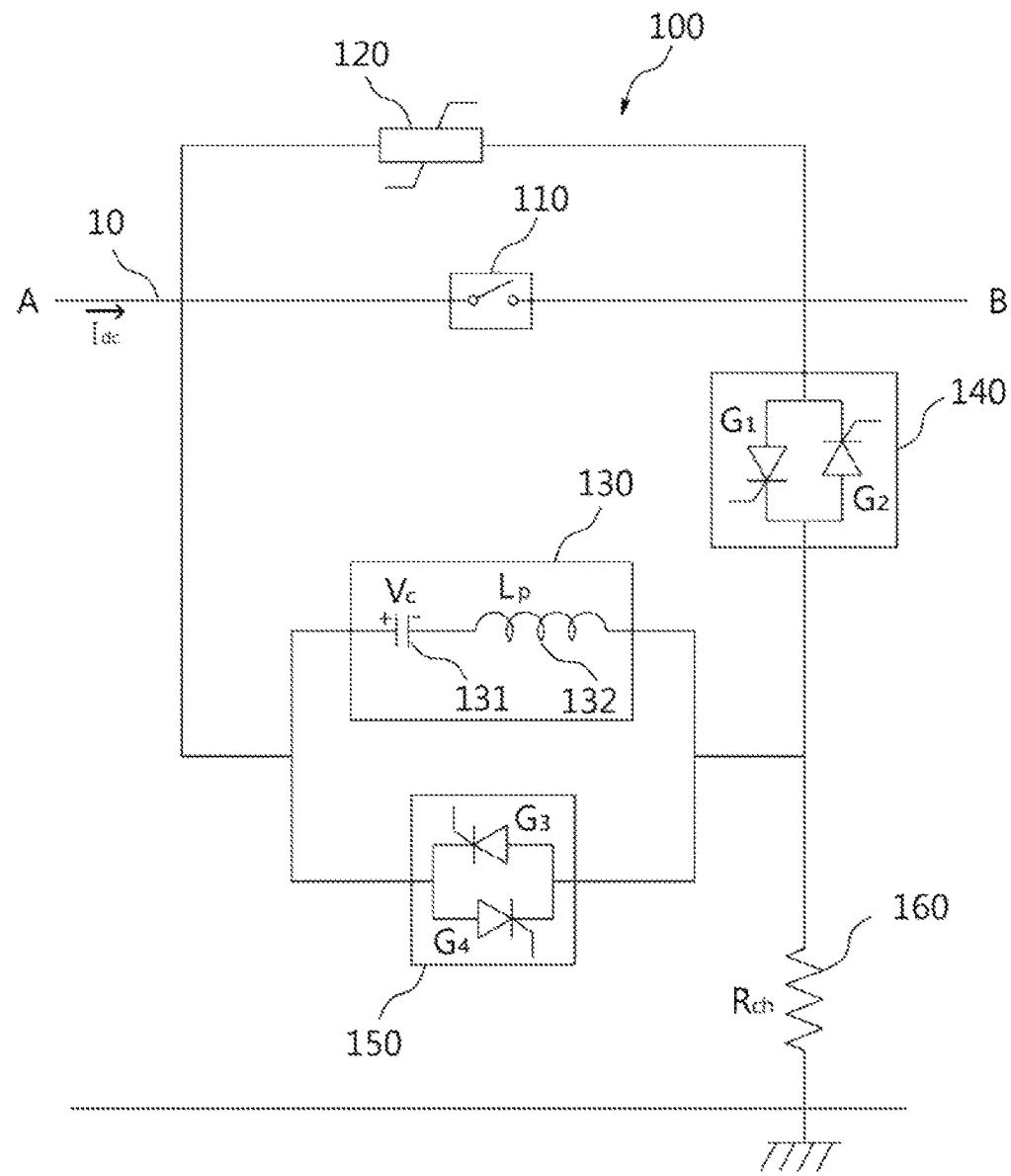
FIG. 2 is a block diagram of a high-voltage DC circuit breaker according to an embodiment of the present invention.

FIG. 2 is a block diagram of a high-voltage DC circuit breaker according to an embodiment of the present invention.

Referring to FIG. 2, the high-voltage DC circuit breaker 100 according to an embodiment of the present invention includes a main switch 110 installed on a DC line 10 that connects A and B. When a fault occurs at A or B, the main switch 110 serves to block the DC line 10 in order to prevent a fault current from continuously flowing to the circuit at which the fault occurs. To this end, the main switch 110, which is closed in a normal state, is opened when a fault occurs. The switching operation of the main switch 110 is controlled by control signals of a control unit (not illustrated).

In the present embodiment, a nonlinear resistor 120 is connected in parallel with the main switch 110, wherein the nonlinear resistor 120 prevents an excessive voltage, equal to or greater than a rated voltage, from being applied to both ends of the high-voltage DC circuit breaker 100 when the main switch 110 is blocked. When a high-voltage equal to or greater than a preset reference voltage arises from a fault and is induced at both ends of the high-voltage DC circuit breaker 100, the linear resistor 120 is automatically turned on and consumes the high-voltage. In the present embodiment, the nonlinear resistor 120 may be implemented as a varistor.

In the present embodiment, because a high-voltage is induced in the DC line 10, a high current flows in the main switch 110. Accordingly, when the main switch 110 is opened due to the occurrence of a fault, an arc is generated across the switch terminals of the main switch 110, and a DC fault current continuously flows in the DC line 10 through the arc. Therefore, the present invention needs an additional element for completely breaking the fault current by extinguishing the arc.

Specifically, an LC circuit 130 and a first bidirectional switching element 140, connected in series, are then connected in parallel with the main switch 110. Also, a second bidirectional switching element 150 is connected in parallel with the LC circuit 130. The LC circuit 130 is configured to include a capacitor 131 and a reactor 132, which are connected in series. In order to make current flow in both directions, the bidirectional switching elements 150 and 160 are configured in such a way that two power semiconductor switches G1 to G4 are connected in parallel and oriented in opposite directions. Although not illustrated in the drawing, the operation of the power semiconductor switches G1 to G4 is controlled by a control unit (not illustrated). In the present embodiment, the power semiconductor switches G1 to G4 are turn-on controllable elements, and may be implemented as thyristors. Alternatively, as turn-on/turn-off controllable elements, they may be implemented as GTO, IGCT, IGBT, or the like.

Additionally, in the high-voltage DC circuit breaker 100 of the present embodiment, a charging resistor 160 is connected between a ground GRD and a contact point of the LC circuit 130 and the first bidirectional switching element 140. Through the charging resistor 160, the capacitor 131 of the LC circuit 130 is initially charged as high as the DC voltage Vc.

Figure 3A:
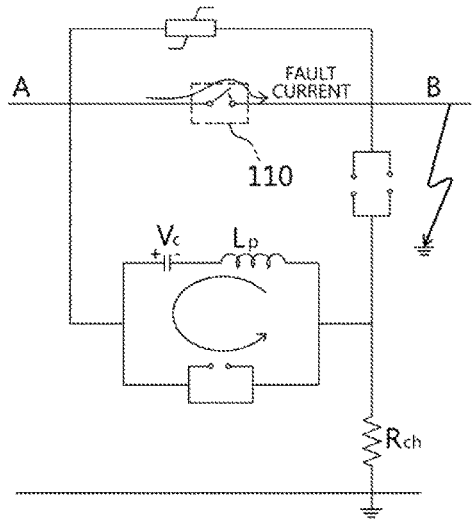
FIGS. 3(a) and 3(b) are schematic diagrams that show a process of breaking a fault current in a high-voltage DC circuit breaker according to the present invention when a fault occurs on one side of a high-voltage DC line.
Figure 3B:
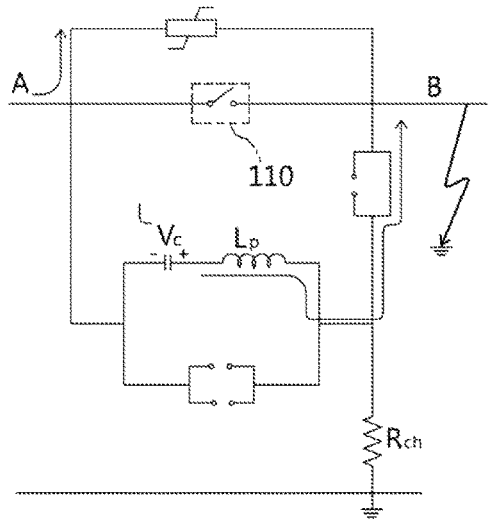
Figure 4A:
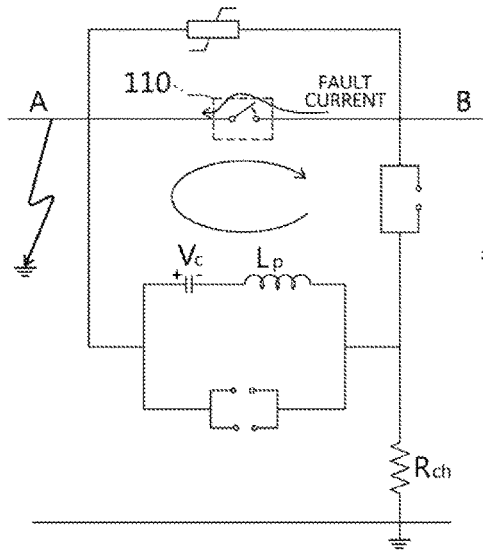
FIGS. 4(a) and 4(b) are schematic diagrams that show a process of breaking a fault current in a high-voltage DC circuit breaker according to the present invention when a fault occurs on the other side of a high-voltage DC line.
Figure 4B:
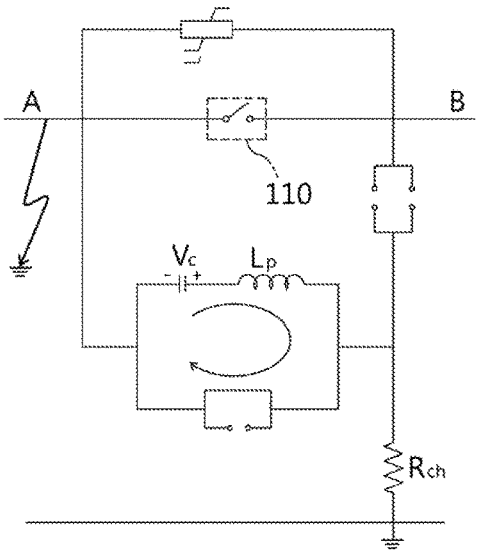

FIGS. 3(a) and 3(b) are schematic diagrams that show a process of breaking a fault current when a fault occurs on one side B of the high-voltage DC circuit breaker according to an embodiment of the present invention, and FIGS. 4(a) and 4(b) are schematic diagrams that show a process of breaking a fault current when a fault occurs on the other side A of the high-voltage DC circuit breaker according to another embodiment of the present invention.

First, when a high-voltage DC circuit breaker 100 according to an embodiment of the present invention is in a normal state, the main switch 110 thereof is closed. Also, the first bidirectional switching element 140 and the second bidirectional switching element 150 are blocked by being turned off. Accordingly, when a voltage is applied to the DC line 10, a steady current flows in the DC line 10 through the main switch 110, and the capacitor 131 is charged with the DC voltage Vc through the capacitor 131 and reactor 132 of the LC circuit 130 and the charging resistor 160.

If a fault occurs at B, a control unit detects the fault and opens the main switch 110, as illustrated in FIGS. 3(a) and (b). When the main switch 110 is opened, an arc is generated across the switch terminals of the main switch 110, and thus a fault current continuously flows from A to B. At this time, if the power semiconductor switch G4, which is the lower switch of the second bidirectional switching element 150, is turned on in the state in which the power semiconductor switches G1 and G2, connected in parallel with each other in the first bidirectional switching element 140, are turned off, LC resonance between the reactor 132 and the capacitor 131 is generated through the power semiconductor switch G4, whereby the voltage of the capacitor 131 becomes −Vc.

Then, the power semiconductor switch G4 is turned off, and the power semiconductor switch G2, which is on the right side in the first bidirectional switching element 140, is turned on. Accordingly, by the voltage −Vc charged in the capacitor 131, current is supplied to B through the power semiconductor switch G2. The supplied current makes the current at the main switch 110 become zero, and thus the arc is extinguished. Here, it is desirable for the current supplied to B to have a magnitude that is greater than that of the fault current that continuously flows through the arc in the main switch 110 and to have a direction opposite to that of the fault current. The charging capacity of the capacitor may be determined so as to satisfy these conditions.

As described above, when the fault current is interrupted by the main switch 110 by completely extinguishing the arc generated at the main switch 110, the voltage at A rapidly increases compared to the voltage at B. While the increased voltage at A is consumed at the nonlinear resistor 120, which is connected in parallel with the main switch 110, the capacitor 131 is recharged with +Vc through the LC circuit 130 and the first bidirectional switching element 140. Then, the power semiconductor switch G2 is turned off.

Here, the high-voltage DC circuit breaker 100 of the present invention has a characteristic such that the operation of reclosing the main switch 110 is possible. In other words, when the fault at B is removed, the control unit may close the main switch 110 so as to make a closed circuit in the DC line 10. When the closed circuit is made by closing the main switch 110, if the fault at B is not removed, the above-mentioned processes are repeated. This reclosing operation can be performed because the capacitor 131 maintains a charged state with +Vc in the LC circuit 130 after the arc is extinguished.

As described above, in the high-voltage DC circuit breaker 100 according to the present invention, the arc generated at the main switch 110 is extinguished by a single LC resonance, so that the fault current that flows through the arc is interrupted.

Meanwhile, when a fault occurs at A, the control unit detects the fault and opens the main switch 110, as illustrated in FIGS. 4(a) and (b). When the main switch 110 is opened, an arc is generated across the switch terminals of the main switch 110, and thus a fault current continuously flows from B to A. In this case, if the power semiconductor switch G1, which is the left switch of the first bidirectional switching element 140, is turned on in the state in which the power semiconductor switches G3 and G4, connected in parallel with each other in the second bidirectional switching element 150, are turned off, current is supplied to A by the voltage stored in the capacitor 131 of the LC circuit 130. The supplied current makes the current at the main switch 110 become zero, whereby the arc is extinguished. Here, it is desirable for the current supplied to A to have a magnitude that is greater than that of the fault current that continuously flows through the arc in the main switch 110 and to have a direction opposite to that of the fault current.

Then, when the fault current is interrupted by the main switch 110 by completely extinguishing the arc generated at the main switch 110, as described above, the voltage at B rapidly increases, and the capacitor 131 of the LC circuit 130 is charged with −Vc. Then, the power semiconductor switch G1 is opened. In this case, if the power semiconductor switch G3 of the second bidirectional switching element 150 is turned on, LC resonance between the capacitor 131 and the reactor 132 is generated through the power semiconductor switch G3, and thus the voltage of the capacitor 131 becomes +Vc. Then, the power semiconductor switch G3 is turned off. Also, the voltage at B, which becomes relatively higher than the voltage at A, is consumed at the nonlinear resistor 120, which is connected in parallel with the main switch 110.

Also in the case of FIGS. 4(a) and 4(b), the high-voltage DC circuit breaker 100 of the present invention may perform an operation of reclosing the main switch 110. In other words, when the fault at A is removed, the control unit may close the main switch 110 so as to make a closed circuit in the DC line 10. When the closed circuit is made by closing the main switch 110, if the fault at A is not removed, the above-mentioned processes are repeated. This reclosing operation can be performed because the capacitor 131 maintains a charged state with +Vc due to the resonance in the LC circuit 130 after the arc is extinguished.

Figure 1:
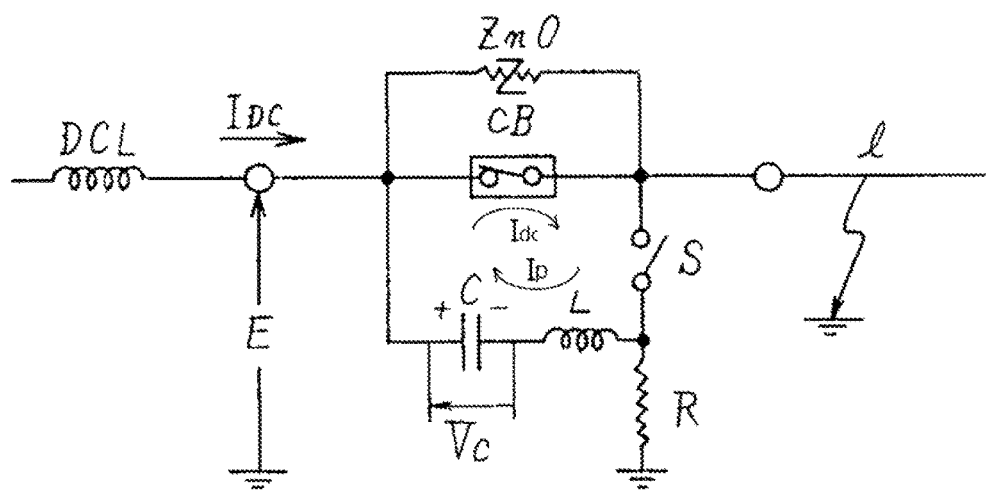
FIG. 1 is a block diagram of a conventional high-voltage DC circuit breaker.

As described above, the high-voltage DC circuit breaker 100 according to the present invention has a characteristic in that the current induced by LC resonance is formed by the power semiconductor switches G3 and G4 of the second bidirectional switching element 150, rather than by the main switch CB, as in the conventional art illustrated in FIG. 1. Therefore, unlike the conventional art, in which the current oscillation attributable to the LC resonance increases, the LC resonance is induced once in order to reverse the voltage polarity of the capacitor 131 of the LC circuit 130. Therefore, the breaking speed is increased compared to the conventional art. Also, unlike the conventional art, the present invention realizes zero current at the main switch 110 by applying a current, flowing in the opposite direction to a fault current flowing in the main switch 110, to the main switch 110, whereby the arc is extinguished.

Although the present invention has been described above in connection with the preferred embodiments, the present invention is not limited to the above embodiments. Those skilled in the art will appreciate that various modifications, additions and substitutions are possible, without departing from the scope and spirit of the invention as disclosed in the accompanying claims. Accordingly, the scope of the present invention should be defined by the scope of the appended claims and equivalents thereof.

The invention claimed is:

1. A high-voltage DC circuit breaker for breaking a current that flows in a DC line, comprising:
   a main switch (110), installed on the DC line, for breaking a current of the DC line by opening when a fault occurs on one side or a remaining side of the DC line;
   a nonlinear resistor (120) connected in parallel with the main switch (110);
   an LC circuit (130) that is connected in series with both the main switch (110) and a first bidirectional switching element (140), and includes a capacitor (131) and a reactor (132), which are connected in series in order to generate LC resonance;
   the first bidirectional switching element (140), is for switching a bidirectional current flow; and
   a second bidirectional switching element (150), connected in parallel with the LC circuit (130), for switching a current flow to induce LC resonance in both directions.

2. The high-voltage DC circuit breaker of claim 1, further comprising a charging resistor (160) for charging the capacitor (131) with a DC voltage (Vc) at initial startup,
   wherein the charging resistor (160) is installed between a ground (GND) and a contact point of the LC circuit (130) and the first bidirectional switching element (140).

3. The high-voltage DC circuit breaker of claim 1, wherein the first bidirectional switching element and the second bidirectional switching element respectively include a pair of turn-on or turn-on/turn-off controllable power semiconductor switches (G1-G2) and a pair of turn-on or turn-on/turn-off controllable power semiconductor switches (G3-G4),
   wherein the pair of the power semiconductor switches are connected in parallel in opposite directions.

4. The high-voltage DC circuit breaker of claim 3, wherein, if an arc is generated when the main switch (110) is opened due to a fault that occurs on the one side of the DC line,
   after the capacitor (131) is charged with a voltage −Vc induced by the LC resonance between the reactor (132) and the capacitor (131) of the LC circuit (130) by turning on one (G4) of the power semiconductor switches of the second bidirectional switching element (150) in a state in which the power semiconductor switches (G1-G2) of the first bidirectional switching element (140) are turned off,
   a current is supplied to the main switch (110) by the voltage −Vc, charged in the capacitor (131), by turning off the power semiconductor switch (G4) and turning on one (G2) of the power semiconductor switches of the first bidirectional switching element (140), and
   the supplied current causes a zero current at the main switch (110), whereby the arc generated in the main switch (110) is extinguished.

5. The high-voltage DC circuit breaker of claim 4, wherein the current supplied to the main switch (110) by the voltage −Vc, charged in the capacitor (131), has a magnitude that is greater than that of a fault current and has a direction opposite to that of the fault current, the fault current continuing to flow through the arc in the main switch (110).

6. The high-voltage DC circuit breaker of claim 4, wherein, after the arc generated in the main switch (110) is extinguished,
   while a voltage at the remaining side of the DC line, which becomes higher than a voltage at the one side of the DC line, is consumed at the nonlinear resistor (120), the capacitor (131) is recharged with a voltage +Vc by a current that flows through the LC circuit (130) and the first bidirectional switching element (140), and then the power semiconductor switch (G2) is turned off.

7. The high-voltage DC circuit breaker of claim 3, wherein if an arc is generated when the main switch (110) is opened due to a fault that occurs on the remaining side of the DC line,
   a current is supplied to the main switch (110) by +Vc, previously charged in the capacitor (131) of the LC circuit (130), by turning on one (G1) of the power semiconductor switches of the first bidirectional switching element (140) in a state in which the power semiconductor switches (G3-G4) of the second bidirectional switching element (150) are turned off, and
   the supplied current causes a zero current at the main switch (110), whereby the arc generated in the main switch (110) is extinguished.

8. The high-voltage DC circuit breaker of claim 7, wherein the current supplied to the main switch (110) by the voltage +Vc, previously charged in the capacitor (131), has a magnitude that is greater than that of a fault current and has a direction opposite to that of the fault current, the fault current continuing to flow through the arc in the main switch (110).

9. The high-voltage DC circuit breaker of claim 7, wherein, after the arc generated in the main switch (110) is extinguished,
   the power semiconductor switch (G1) is turned off after the capacitor (131) of the LC circuit (130) is charged with −Vc by a voltage on the one side of the DC line, which becomes higher than a voltage on the remaining side of the DC line; and
   the capacitor (131) is recharged with a voltage +Vc by LC resonance between the capacitor (131) and the reactor (132) of the LC circuit (130) by turning on one (G3) of the power semiconductor switches of the second bidirectional switching element (150).

10. The high-voltage DC circuit breaker of claim 9, wherein the voltage on the one side of the DC line, which becomes higher than the voltage on the remaining side of the DC line, is consumed at the nonlinear resistor (120).

11. The high-voltage DC circuit breaker of claim 2, wherein the first bidirectional switching element and the second bidirectional switching element respectively include a pair of turn-on or turn-on/turn-off controllable power semiconductor switches (G1-G2) and a pair of turn-on or turn-on/turn-off controllable power semiconductor switches (G3-G4), wherein the pair of the power semiconductor switches are connected in parallel in opposite directions.

* * * * *